Oct. 2, 1928.
A. A. MACKERT
HOSE COUPLING GASKET
Filed Jan. 4, 1927
1,685,852
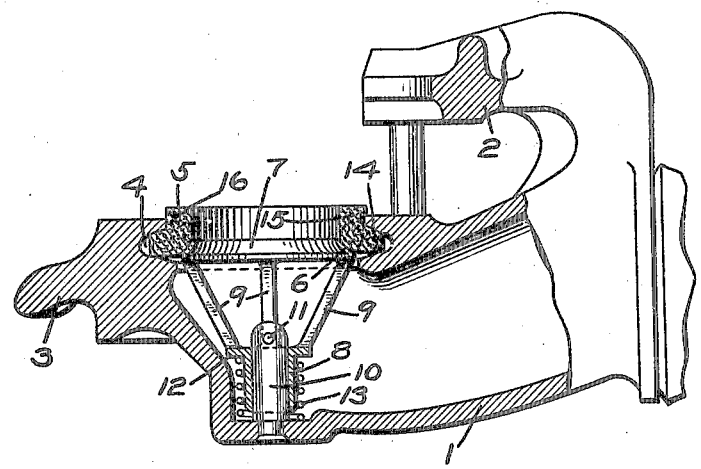
INVENTOR
ALBERT A. MACKERT
BY *Wm. N. Cady*
ATTORNEY Patented Oct. 2, 1928.

1,685,852

UNITED STATES PATENT OFFICE.

ALBERT A. MACKERT, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

HOSE-COUPLING GASKET.

Application filed January 4, 1927. Serial No. 158,936.

This invention relates to hose couplings and more particularly to the type of hand operated hose couplings employed to connect up the fluid pressure brake pipe between cars.

The standard hose coupling head is provided with an annular recess, adjacent to the meeting face of the coupling and adapted to receive a corresponding flange portion of a hose coupling gasket. The annular recess has flaring walls while the gasket flange is wedge shaped, so that when assembled, the wedge faces of the gasket flange are adapted to seal against the flared walls of the recess in the coupling head.

It sometimes occurs that the gasket flange fits so poorly in the recess as to cause a distortion of the gasket, which permits leakage around the outer walls of the gasket and causes a contraction of the central opening through the gasket, with a resultant restriction to the flow of fluid under pressure. A distorted gasket prevents accurate engagement with a corresponding gasket in a counterpart coupling head and results in a tendency to leakage, as well as a variation in the degree of compression of gaskets when coupling. Furthermore, gaskets tend to take a permanent set, due to being held under compression in the coupled position, with the result that such a gasket having a permanent set acts at a reduced pressure against a counterpart gasket, so that there is liable to be insufficient pressure to effect a tight seal between two gaskets.

The principal object of my invention is to provide an improved hose coupling head in which the above difficulties are overcome.

In the accompanying drawing, the single figure is a fragmentary sectional view of a hose coupling head and gasket, embodying my invention.

As shown in the drawing, the coupling head 1 is provided with the usual locking flanges 2 and 3 and has an annular recess 4, adjacent to the meeting face of the head, said recess having flaring walls, such as employed in the standard hose coupling head. The flange of a standard gasket 5 is fitted into the recess 4.

According to my invention, means are provided for exerting a pressure on the gasket in such a way that the heretofore described difficulties are overcome. For this purpose a ring 7 is provided having a concave face adapted to engage the rounded corner 6 of the gasket. Integral with said ring are struts 9 which are also integrally joined to a flange portion 12 of a sleeve 8. The sleeve 8 is slidably mounted on a stem 10 secured to the coupling head body and a coil spring 13 is interposed between the coupling head and the flanged portion 12 of the stem 10. Outward movement of the sleeve by the spring 13 is limited by a stop pin 11 carried by the stem 10 and movement of the sleeve in the opposite direction is limited by engagement with the inner wall of the coupling head.

The pressure of the spring 13 is transmitted through the flange 12 of the sleeve 8 and the struts 9 to the ring 7, which therefore exert a pressure against the corner 6 of the gasket 5, tending to push the flange 14 of said gasket into the annular recess 4, thereby wedging the sides of said gasket flange against the walls of the recess, so as to effect a tight seal to prevent leakage around the outer walls of said gasket. The pressure exerted by the ring 7 also tends to hold the cylindrical portion 15 of the gasket 5 outwardly and at the same time said cylindrical portion is forced against the annular wall 16 of the hose coupling head. Thus, besides effecting a tight seal at the flange portion of the gasket, the gasket is maintained in engagement with the annular wall 16 so as to provide the maximum area of opening through said gasket.

When two counterpart couplings are coupled together, a uniform compression of the two engaging gaskets is ensured by the constant opposing pressure of the spring 13. Even though a gasket should have a permanent set, the constant pressure of spring 13 ensures that said gasket will exert a pressure the same as a new gasket.

Since the pressure of the ring 7 against the gasket 5 tends to effect a tight seal of the gasket flange 14 in the recess 4, moisture or dirt cannot enter and become deposited on the sealing surfaces engaged by the gasket, so that said surfaces will not become pitted or rusted and thus cause leakage; it being noted, that with the usual hose coupling, such pitting and rusting is often such that the recess is unfit for the installation of a new gasket.

Having now described my invention, what

I claim as new and desire to secure by Letters Patent, is:—

The combination with a hose coupling head having a conduit provided with an opening at the meeting face of the head and having an annular recess adjacent to said opening, and a gasket having an annular flange disposed in said recess, of a stem mounted in said head in axial alinement with said opening, a member slidably mounted on said stem and engaging said gasket, and a spring acting on said member and tending to press same in engagement with said gasket, and a stop carried by said stem and adapted to be engaged by said member for limiting the movement of said member by said spring.

In testimony whereof I have hereunto set my hand.

ALBERT A. MACKERT.